United States Patent [19]

Shapero et al.

[11] 3,728,988

[45] Apr. 24, 1973

[54] MARINE LIFE STORAGE HABITAT MEDIUM AND SHIPPING METHOD

[75] Inventors: Wallace H. Shapero, Torrance; Albert Cane, Inglewood, both of Calif.

[73] Assignee: Mattel, Inc., Hawthorne, Calif.

[22] Filed: Jan. 22, 1971

[21] Appl. No.: 108,832

[52] U.S. Cl. ................................. 119/2, 252/186
[51] Int. Cl. ............................................. A01k 61/00
[58] Field of Search ................................... 119/1–5; 210/59, 63; 23/60

[56] References Cited

UNITED STATES PATENTS

| 3,236,206 | 2/1966 | Willinger | 119/3 |
| 2,245,495 | 6/1941 | Pemble | 252/186 |
| 3,623,455 | 11/1971 | Kelley | 119/3 |
| 2,672,845 | 3/1954 | Schneithorst | 119/5 |
| 3,029,784 | 4/1962 | Elbreder et al. | 119/2 |

OTHER PUBLICATIONS

The Merck Index, 8th Ed. 1968 page 963, Copy AU 331

*Primary Examiner*—Aldrich F. Medbery
*Attorney*—Seymour A. Scholnick

[57] ABSTRACT

Marine life, such as live brine shrimp, are stored in an aqueous habitat medium including a unitary oxygen-releasing, carbon dioxide-diminishing agent, namely sodium perborate, during shipment in containers, either open or closed, to extend the time the marine life may be maintained in a given amount of the aqueous medium.

5 Claims, 1 Drawing Figure

PATENTED APR 24 1973　　　　　　　　　　　　　　　3,728,988
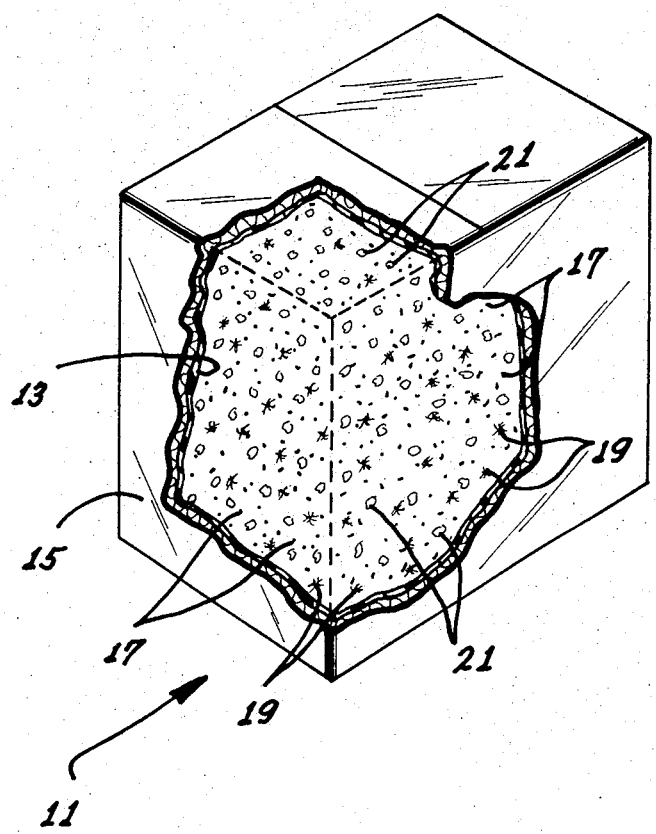
INVENTORS
WALLACE H. SHAPERO
ALBERT CANE
Max E. Shirk
BY　　　　　　ATTORNEY

MARINE LIFE STORAGE HABITAT MEDIUM AND SHIPPING METHOD

BACKGROUND OF THE INVENTION

The background of the invention will be set forth in two parts.

1. Field of the Invention

The present invention pertains generally to the field of animal husbandry, and more particularly to marine life storage habitat mediums and shipping methods.

2. Description of the Prior Art

Certain marine life, such as shrimp and other shellfish, are shipped live from their natural habitat to a remote point of use. This may be done by air shipping ten-pound units containing a pint (16 ounces) of drained brine shrimp immersed in three quarts of brine solution. This means shipping about 98.5 percent water. This water content has been deemed necessary in order to provide oxygen and to retard the build-up of carbon dioxide concentration.

U.S. Pat. No. 2,563,364 suggests the shipment of shellfish in containers or water saturated with oxygen. The gaseous atmosphere above the water (ullage) is displaced by or saturated with oxygen to supply the requirements of the shellfish during the period of confinement within the container. This patent suggests that the oxygen gas may be introduced into the container in any suitable manner, but if desired, a suitable oxygen-evolving material or device may be employed, provided that such is capable of maintaining an adequate oxygen supply. This patent does not, however, suggest a suitable oxygen-evolving material or the quantities of such material to be used for satisfactory results.

U.S. Pat. No. 2,563,364 also suggests the use of a basic compound in the environment within the container in sufficient quantities to establish a pH of at least 9 or more for providing a medium which is effective to react with the carbon dioxide expelled by the shellfish to form a non-toxic carbonate which may be in part precipitated. Additionally, it is suggested that certain stable soluble salts of alkali metal and alkaline earth group beneficially increase salinity, and that the temperature of the water in the containers may advantageously be reduced as low as expedient, but short of freezing or injury to the shellfish, and that temperatures between 0°–5°C are convenient.

The providing of an oxygen generating agent and another agent to control the pH factor and carbon dioxide ($CO_2$) level are thus known, but a low cost unitary agent which provides necessary oxygen and reduces the carbon dioxide level while maintaining the pH level of a marine life supporting aqueous medium has not heretofore been known. Accordingly, it should be evident that such a unitary agent would constitute a significant advancement of the art.

OBJECTS AND SUMMARY OF THE INVENTION

In view of the foregoing factors and conditions characteristic of marine life storage habitat mediums and shipping methods, it is a primary object of the present invention to provide a marine life storage habitat medium and a shipping method exemplifying improvements over the prior art.

Another object of the present invention is to provide a marine life storage habitat medium which includes a unitary oxygen-releasing and carbon dioxide-diminishing agent.

A further object of the present invention is to provide an improved marine life shipping method.

According to the present invention, marine life, such as live brine shrimp, is shipped in an aqueous habitat medium including a unitary oxygen-releasing carbon-dioxide-reclaiming agent, namely, sodium perborate, to extend the time the marine life may be maintained in a given amount of the aqueous medium.

The features of the present invention which are believed to be novel are set forth with particularity in the appended claims. The present invention, both as to its organization and manner of operation, together with further objects and advantages thereof, may best be understood by reference to the following description.

DESCRIPTION OF THE PREFERRED EMBODIMENT:

Referring to the drawing, there is shown a shipping container 11 consisting of a polyethylene bag 13 in a corrugated paper carton 15. The bag 13 may, for example, have dimensions of 14 inches × 20 inches, and contain 3 pints (48 ounces) of drained brine shrimp 17 reconstituted with 3 quarts of 5 percent brine solution 19, consisting of 4½:1 ratio of rock salt to Epsom salts ($MgSO_4 \cdot 7H_2O$), the brine having been aerated prior to use.

To the solution 19 is added a uniquely advantageous marine life sustaining agent 21, sodium perborate ($NaBO_3 \cdot 4H_2O$) preferably in pelletized form. The amount of this agent added to the brine is not critical and concentrations of between 2 and 8% $NaBO_3$ based on water content have proved satisfactory, with 3½ to 4 percent being preferable.

As noted previously, containerized sea life must be supplied with oxygen and some scheme must be used to negate the poisonous effects of the self-generated carbon dioxide. It has been discovered that sodium perborate, which is available commercially at a reasonable cost, enhances considerably the survival of marine life in closed containers by decomposing slowly in the solution 19 to provide oxygen to the brine solution 19 while reacting with any carbon dioxide in the solution by converting it to the carbonate ions to reduce its concentration to a non-toxic level. For example, commercially available $NaBO_3 \cdot 4H_2O$ has approximately 9.9 percent available oxygen and may be expressed by the equation:

$$2NaBO_3 \longrightarrow 2NaBO_2 + O_2\uparrow \qquad (1)$$

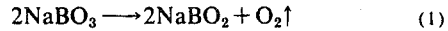

The carbon dioxide controlling factor of this agent may be expressed by $NaBO_2 + 2H_2O \longrightarrow Na^+ + H_3BO_3 + OH^-$, the latter being the hydroxyl ion. This ion reacts with carbon dioxide to form a bicarbonate ion ($HCO_3^-$) as follows:

$$CO_2 + OH^- \longrightarrow HCO_3^-. \qquad (2)$$

In turn, the bicarbonate ion reacts with more hydroxyl ions to form non-toxic carbonate ions:

$$HCO_3^- + OH^- \longrightarrow CO_3^{-2} + H_2O. \qquad (3)$$

It has also been found that the sodium perborate decomposes at a faster rate as the pH of the brine solution 19 moves toward the acid side, which action tends to counteract this dangerous acidic condition. Thus, this unitary agent is self-regulating, neutralizes over-acidity, and maintains the pH factor of the aqueous habitat medium in the desired range between 7.4 and 10.

In carefully controlled tests comparing a previously known basic composition, magnesium oxide, with sodium perborate, samples were made up in 3 mil polyethylene bags (3½ × 6 inches) with 60 ml of bring shrimp in the aforementioned 5 percent brine solution. The following table illustrates the definite advantages of sodium perborate over the previously known agent and over a solution having no agent at all:

|  | Quantity | 6 hours | 12 hours | 19 hours | Final pH |
|---|---|---|---|---|---|
| 1 Control — none | — | All dead | — | — | 6 |
| 2 Magnesium oxide | 2.36g | 75% Alive | 5% Alive | 1% Alive | 7 |
| 3 Sodium perborate | 1.5g | 100% alive and frisky | 100% alive and frisky | 80% alive and frisky | 8.5 |

Contrary to the teachings found in the prior art, it has also been found that when sodium perborate is used as the oxygen generating-carbon dioxide eliminating agent in either sealed polyethylene bags or in closed jars containing brine shrimp, the temperature of the aqueous habitat medium may advantageously be lowered to about 32°F and need not be maintained above this level.

It should be pointed out that the addition of the preferred concentration of sodium perborate to a brine solution definitely prolongs the storage life of brine shrimp and other sea life by (1) releasing oxygen at a controlled rate, (2) maintaining the brine at an alkaline pH that removes carbon dioxide which is toxic to such sea life, and (3) maintains the brine within a pH range optimum for marine life.

This invention has been described in its presently preferred embodiment and it should be clear that it is susceptible to modifications and other embodiments. Accordingly, it is intended that the foregoing disclosure and drawing shall be considered only as illustrations of the principles of this invention and are not to be construed in a limiting sense.

What is claimed is:

1. A transportation and storage habitat medium for brine shrimp comprising:

a container for transportation and storage of the brine shrimp, an aqueous habitat medium disposed in said container, said aqueous habitat medium being aerated and including a 5 percent brine solution consisting of a 4½:1 ratio of rock salt to Epsom salts, said aqueous habitat medium further including brine shrimp life-sustaining means for providing oxygen to said brine solution while reacting with any carbon dioxide in said brine solution by converting said carbon dioxide to carbonate ions to reduce carbon dioxide concentration to a non-toxic level, said life-sustaining means including sodium perborate added to said aqueous habitat medium in a sufficient quantity, said quantity of said sodium perborate added to said aqueous habitat medium providing a concentration of between 2 and 8 percent sodium perborate.

2. A transportation and storage habitat medium according to claim 1, wherein said container includes a polyethylene bag, said aqueous habitat medium being disposed in said bag.

3. A transportation and storage habitat medium according to claim 1, wherein said container further includes a corrugated paper carbon for shipment, said bag being disposed in said carton.

4. A transportation and storage habitat medium according to claim 1, wherein said concentration is 3½ percent sodium perborate.

5. A transportation and storage habitat medium according to claim 1, wherein said concentration is 4 percent sodium perborate.

* * * * *